(12) United States Patent
Ohrt et al.

(10) Patent No.: US 11,543,643 B2
(45) Date of Patent: Jan. 3, 2023

(54) IMMERSION MICROSCOPY

(71) Applicant: Carl Zeiss Microscopy GmbH, Jena (DE)

(72) Inventors: Thomas Ohrt, Golmsdorf (DE); Michael Goegler, Wolfratshausen (DE); Thorsten Kues, Bovenden-Eddigehausen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 241 days.

(21) Appl. No.: 16/640,714

(22) PCT Filed: Aug. 6, 2018

(86) PCT No.: PCT/EP2018/071274
§ 371 (c)(1),
(2) Date: Feb. 20, 2020

(87) PCT Pub. No.: WO2019/038071
PCT Pub. Date: Feb. 28, 2019

(65) Prior Publication Data
US 2020/0183141 A1 Jun. 11, 2020

(30) Foreign Application Priority Data
Aug. 21, 2017 (DE) .......................... 102017119093.7

(51) Int. Cl.
*G02B 21/33* (2006.01)
*G02B 21/34* (2006.01)
*G02B 27/00* (2006.01)

(52) U.S. Cl.
CPC ......... *G02B 21/33* (2013.01); *G02B 27/0006* (2013.01); *G02B 21/34* (2013.01)

(58) Field of Classification Search
CPC .... G02B 21/0088; G02B 21/02; G02B 21/33; G02B 21/18; G01N 1/28; C07F 7/04; G11B 7/244; G03F 7/0341
See application file for complete search history.

(56) References Cited

U.S. PATENT DOCUMENTS

| 5,200,152 A | 4/1993 | Brown |
| 6,555,384 B1 | 4/2003 | Angros |

(Continued)

FOREIGN PATENT DOCUMENTS

| CN | 1914563 A | 2/2007 |
| CN | 102422198 A | 4/2012 |

(Continued)

OTHER PUBLICATIONS

Ta, Van Duong, et al., "Laser textured superhydrophobic surfaces and their applications for homogeneous spot deposition," *Applied Surface Science*, vol. 305, pp. 153-159 (2016).

(Continued)

*Primary Examiner* — Mustak Choudhury
(74) *Attorney, Agent, or Firm* — Christensen, Fonder, Dardi & Herbert PLLC

(57) ABSTRACT

A microscope objective for imaging a specimen using a microscope, the microscope objective having a front lens enclosed by a surround and being designed for microscopy with an immersion liquid. In the microscope objective, the front lens and/or the surround thereof is provided with a coating which can be switched between a state which repels the immersion liquid and a state which does not repel the immersion liquid.

12 Claims, 3 Drawing Sheets

(56) References Cited

U.S. PATENT DOCUMENTS

| | | | |
|---|---|---|---|
| 6,809,794 B1 | 10/2004 | Sewell | |
| 8,001,857 B2 | 8/2011 | Kahl | |
| 8,465,708 B2 | 6/2013 | Harada et al. | |
| 8,465,709 B2 | 6/2013 | Harada et al. | |
| 2004/0257962 A1* | 12/2004 | Walker | G11B 7/1374 369/112.01 |
| 2005/0052754 A1 | 3/2005 | Quake et al. | |
| 2005/0179997 A1* | 8/2005 | Komatsu | G02B 21/33 359/368 |
| 2006/0237698 A1 | 10/2006 | Fukunaga et al. | |
| 2006/0264650 A1 | 11/2006 | Arora | |
| 2006/0275918 A1 | 12/2006 | Harada et al. | |
| 2007/0018057 A1 | 1/2007 | Kovac | |
| 2007/0035720 A1 | 2/2007 | Naylor et al. | |
| 2007/0285637 A1 | 12/2007 | Dorsel et al. | |
| 2008/0137064 A1 | 6/2008 | Arata et al. | |
| 2010/0103510 A1 | 4/2010 | Kimura | |
| 2012/0112095 A1 | 5/2012 | Baer | |
| 2012/0133757 A1 | 5/2012 | Thomas et al. | |
| 2013/0120833 A1 | 5/2013 | Hirano et al. | |
| 2014/0333998 A1 | 11/2014 | Kohli et al. | |
| 2015/0031071 A1 | 1/2015 | Winther | |
| 2015/0241682 A1 | 8/2015 | Kues et al. | |
| 2015/0277093 A1 | 10/2015 | Schön et al. | |
| 2015/0355446 A1 | 12/2015 | Kues et al. | |
| 2015/0361279 A1 | 12/2015 | Fournand | |
| 2016/0199878 A1 | 7/2016 | Vystavel et al. | |
| 2016/0334612 A1 | 11/2016 | Stoecker et al. | |
| 2017/0045726 A1 | 2/2017 | Fujioka et al. | |
| 2017/0075099 A1 | 3/2017 | Fine et al. | |
| 2017/0199368 A1 | 7/2017 | Goodwin et al. | |
| 2018/0275397 A1 | 9/2018 | Chung et al. | |

FOREIGN PATENT DOCUMENTS

| | | |
|---|---|---|
| CN | 105278090 A | 1/2016 |
| DE | 86 24 431.0 | 1/1987 |
| DE | 20 2011 005 278 U1 | 11/2012 |
| EP | 1 679 541 A1 | 7/2006 |
| EP | 1 717 628 A1 | 11/2006 |
| EP | 2 256 535 A1 | 12/2010 |
| EP | 3 043 372 A1 | 7/2016 |
| JP | 2007-316233 A | 12/2007 |
| JP | 2009-217049 A | 9/2009 |
| JP | 4603295 B2 | 12/2010 |
| JP | 2013-105156 A | 5/2013 |
| WO | WO 2004/092677 A1 | 10/2004 |
| WO | WO-2015010783 A1 * | 1/2015 ............ G02B 21/02 |
| WO | WO 2015/181367 A1 | 12/2015 |
| WO | WO 2017/099459 A1 | 6/2017 |

OTHER PUBLICATIONS

Groten, Jonas, et al., "Light-Induced Switching of Surfaces at Wetting Transitions through Photoisomerization of Polymer Monolayers," *Langmuir*, vol. 28, No. 42, 9 pages (2012).

Guenther, "Light-sheet microscopy," https://sguenther.eu/science/light-sheet-microscopy/, 5 pages.

Lahann, Joerg, et al., "A Reversibly Switching Surface," *Science*, vol. 299, pp. 371-374 (Jan. 17, 2003).

Keller, H. Ernst, "Objective Lenses for Confocal Microscopy," *Handbook of Biological Confocal Microscopy*, Third Edition, pp. 145-161 (2006).

Hell, S., et al., "Aberrations in confocal fluorescence microscopy induced by mismatches in refractive index," *Journal of Microscopy*, vol. 169, Pt. 3, pp. 391-405 (Mar. 1993).

Murphy, Douglas B., "Fundamentals of Light Microscopy and Electronic Lighting," 385 pages (2013).

Nakayama, Masamichi, et al., "Light-sensitive Fluoropolymer Coated Surface for Control of Cell Adhesion Behavior," *Society for Biomaterials Annual Meeting and Exposition*, ISBN: 978-1-5108-0106-6, 4 pages (2015).

Rosario, Rohit, et al., "Lotus Effect Amplifies Light-Induced Contact Angle Switching," *J. Phys. Chem. B.*, vol. 108, No. 34, 3 pages (2004).

Takei, Yoshiyuki G., et al., "Dynamic Contact Angle Measurement of Temperature-Responsive Surface Properties for Poly(N-isopropylacrylamide) Grafted Surfaces," *Macromolecules*, pp. 6163-6166 (1994).

Tkaczyk, Alan H., et al., "Fluidic Switching of High-Speed Air-Liquid Two-Phase Flows Using Electrowetting-On-Dielectric," *7th Int. Conference on Micro Total Analysis Systems, Microtas*, pp. 461-464 (Oct. 5, 2003).

Yao, Lin, et al., "Recent progress in antireflection and self-cleaning technology—From surface engineering to functional surfaces," *Progress in Materials Sciences*, vol. 61, pp. 94-143 (2014).

Zhou, Yin-Ning, et al., "Light-Responsive Smart Surface with Controllable Wettability and Excellent Stability," Department of Chemical Engineering, School of Chemistry and Chemical Engineering, Shanghai Jiao Tong University (11 pages).

Chinese Search Results for CN 2018800539051, dated Mar. 2, 2021 (1 page).

* cited by examiner

IMMERSION MICROSCOPY

PRIORITY CLAIM

The present application is a National Phase entry of PCT Application No. PCT/EP2018/071274, filed Aug. 8, 2018, which claims priority from German Patent Application 10 2017 119 093.7, filed Aug. 21, 2017, the disclosures of which are hereby incorporated by reference herein in their entirety.

FIELD OF THE INVENTION

The invention relates to a microscope objective for imaging a sample using a microscope, wherein the microscope objective comprises a front lens enclosed by a mount and is embodied for microscopy with an immersion liquid. Further, the invention relates to a sample carrier or cover slip for examining a sample, to be disposed on the sample carrier or under the cover slip, by immersion microscopy. The invention likewise relates to a method for examining a sample by microscopy using an immersion microscope in a microscopy process, wherein use is made of a microscope objective that comprises a front lens enclosed by a mount. Finally, the invention also relates to an immersion microscope comprising a microscope objective of the aforementioned type.

BACKGROUND OF THE INVENTION

The prior art has disclosed various approaches for ensuring that a front lens of a microscope objective is wetted as completely as possible with an immersion medium. EP 1717628 A1 and EP 2256535 A1 disclose a mechanism for inverted microscope objectives, i.e., microscope objectives that examine a sample by microscopy from below. A mechanism is provided on the front edge of the objective casing, said mechanism preventing a drop of immersion liquid placed on the front lens from running off over the front edge of the objective casing. Moreover, provision is made of outflow tubes that drain the immersion liquid downward in targeted fashion. An inner zone of the edge is configured to repel the immersion liquid for which the microscope is designed. A surrounding outer zone is configured in exactly the opposite way, and so it drains immersion liquid reaching it to the outside. With reference to further publications, JP 4603295 discusses various concepts that avoid contamination of the objective interior with immersion liquid. Two of the solutions described therein correspond to those of the specified EP documents. A third solution, which is described in the Japanese publication, provides for a groove on the objective that prevents excess immersion liquid from running into the objective. Further, for an oil immersion-based microscope, JP 4603295 proposes a lipophilic coating on the lens surface, which is surrounded by a lipophobic coating on the edge of the lens surface. Thus, the prior art is concerned in various approaches with avoiding contamination of an objective with immersion liquid or draining excess immersion liquid in a targeted manner.

SUMMARY OF THE INVENTION

Difficulties arise when using immersion media, particularly in the case of scanning microscopy. The travel speed with which the objective can be displaced over the sample is limited by the fact that shear forces occur at too high movement speeds, said shear forces possibly leading to the immersion film tearing off or to an inadmissible deformation of an elastomeric immersion medium. In the case of an elastomeric immersion medium, an excessive shear force can sometimes displace the cover slip and thus lead to the sample being destroyed. A sample holder that is not completely fixed can also be displaced in this way, rendering it impossible to approach defined coordinates in the sample again. These problems can only be counteracted by using an excessive amount of immersion medium at the beginning of the microscopy process in order to compensate for the fact that the immersion medium is lost or deformed due to the travel speed and the resulting shear forces, leading to parts of the beam path being without immersion medium. As a result, however, the sample becomes contaminated by the immersion medium and the immersion medium consumption is sometimes quite high, which is costly.

Particularly in the case of microscope objectives that can be used with different immersion liquids, it is tedious for a user to remove the immersion liquids. Contamination of the objective with immersion liquid is a problem. A contaminated immersion objective, to which remains of an immersion liquid that is not suitable for the current microscopy process adheres, leads to poor imaging quality.

The invention is therefore based on the object of ensuring a consistently high imaging quality in microscopy.

Embodiments of the invention are defined in the independent and dependent claims.

The microscope objective for imaging a sample using an immersion microscope comprises a front lens. This is enclosed by a mount. It is embodied for microscopy with an immersion liquid. The front side, e.g., the front lens and/or the mount thereof, can be switched between a state that repels the immersion liquid and a state that does not repel, or even attracts, the immersion liquid. As an alternative or in addition thereto, the sample carrier or the cover slip has such a configuration. This can be achieved in each case by way of a surface treatment, which imparts the desired, switchable repulsive properties. The treatment can be a coating. Equally, a structure could be introduced into the surface, said structure producing the properties, or the surface could be treated in some other way, for example chemically, in order to obtain the properties. Insofar as coatings are mentioned below, this is purely by way of example.

Coatings are known, for example, from J. Lahann, et al., "A Reversibly Switching Surface", Science, Vol. 299, pages 371 to 374, or N. Nakayama, et al., "Light-Sensitive Fluorpolymer Coated Surface for Control of Cell Adhesion Behaviour", Front. Bioeng. Biotechnol. Conference Abstract: 10th World Biomaterials Congress. doi: 10.3389/conf.FBIOE.2016.01.01728, or R. Rosario, et al., "Lotus Effect Amplifies Light-Induced Contact Angle Switching", J. Phys. Chem. B. Letters 2004, 108 (34), pages 12640-12642.

The microscope objective can be switched, either electrically or by radiating in illumination of a certain type, between a state that repels a liquid and a state that does not repel, or sometimes even attracts, the liquid. This switchability allows easy cleaning of the microscope objective by virtue of switching the treatment into the state that repels the immersion liquid. The immersion liquid then runs off on the microscope objective.

The provision of a drainage channel for repelled immersion liquid on the objective by virtue of providing an immersion-repellent border, e.g., a layer, on the mount and on an objective casing, said border layer at least partially enclosing the front lens, is preferred. Said border layer leaves a field or area, which extends away from the front side, clear on the objective surround and objective casing. It defines a drainage channel. The immersion medium-repellent treatment used in the process can be the same as on the front lens of the microscope objective. However, since immersion medium should preferably not adhere to the objective mount and objective casing at any time, it is preferable to make them constantly lipophobic and hydrophobic. The provision of a receptacle for the drained immersion medium at the end of the drainage channel is expedient.

Within the scope of the invention, the switchable repulsion property can also be provided on a sample carrier or a cover slip for microscopy. The terms "sample carrier" and "cover slip" should be interpreted broadly here and comprise membranes or other sample delimiting elements, in particular. Such elements are included insofar as the sample carrier or cover slip is mentioned below. This reduces the contamination on the side of the preparation and ensures the complete wetting of the surface, so that there are no image artifacts due to scratches and contamination.

In the case of a microscope comprising a microscope objective with the aforementioned switchability, a control device is preferably embodied in such a way that it cleans the immersion liquid off the microscope objective following the completion of a microscopy process by virtue of switching the objective and/or sample carrier/cover slip into the state that repels the immersion liquid.

This switchover by the controller can advantageously be used if the microscope comprises both the specified microscope objective and the specified sample carrier or cover slip. Here, the sample can be scanned to find a region to be examined by microscopy, wherein, in this state, the control device switches the sample carrier or the cover slip into the state that repels the coating. In the scanning immersion microscopy subsequently carried out, the surface of the sample carrier or of the cover slip, over which the immersion objective wetted with the immersion medium is displaced in relative fashion, is in a state that repels the immersion medium. In this way, much lower shear forces act in the immersion medium. The surface is not smeared with immersion liquid. A drop, once applied, remains on the objective because, due to the repulsive coating, it does not adhere to, or smear on, the surface of the sample carrier or cover slip. Once the region to be imaged has been found within the scope of the scanning process, the control device switches the coating on the sample carrier/cover slip into the state that does not repel the immersion liquid. This ensures an optimal wetting of the sample carrier or of the cover slip and of the microscope objective with the immersion liquid when the region to be imaged is examined by microscopy.

The repulsive treatment of the sample carrier or cover slip allows the immersion objective to be removed from the sample in such a way that as far as possible no immersion liquid remains on the sample carrier/cover slip. There are various options here. Firstly, the objective can simply be removed from the surface of the sample carrier/cover slip. In so doing, the distance between the objective and the treated surface is increased until the immersion liquid remains as completely as possible on the objective due to the repulsive properties of the surface of the sample carrier/cover slip. As an alternative or in addition thereto, the objective can be displaced laterally with respect to the surface until it has been moved over the edge of the sample carrier/cover slip. In this way, the immersion liquid is likewise manipulated such that it remains on the objective and not on the sample carrier/cover slip. This procedure is advantageous in that a change between an objective with immersion and an objective without immersion, e.g., an objective embodied as an overview objective, is easily possible, without the image deteriorating. As no immersion liquid remains on the surface following the removal of the immersion objective, no disturbances arise for the immersion-free objective, e.g., the overview objective, either.

The proposed measures are possible in the case of an inverted microscope, and equally in the case of upright microscopy or for light sheet microscopy, too.

It is understood that the features specified above and the features yet to be explained below can be used not only in the specified combinations, but also in other combinations or on their own, without departing from the scope of the present invention.

BRIEF DESCRIPTION OF THE DRAWINGS

The invention is explained in even more detail below on the basis of exemplary embodiments, with reference being made to the appended drawings, which likewise disclose features essential to the invention. These exemplary embodiments are only illustrative and should not be construed as restrictive. By way of example, a description of an exemplary embodiment with a multiplicity of elements or components should not be construed as meaning that all of these elements or components are necessary for implementation. Rather, other exemplary embodiments could also contain alternative elements and components, fewer elements or components or additional elements or components. Elements or components of different exemplary embodiments can be combined with one another, unless stated otherwise. Modifications and variations, which are described for one of the exemplary embodiments, can also be applicable to other exemplary embodiments. To avoid repetitions, the same or corresponding elements in different figures are denoted by the same reference sign and are not explained multiple times. In the figures.

DETAILED DESCRIPTION

Figure 1:
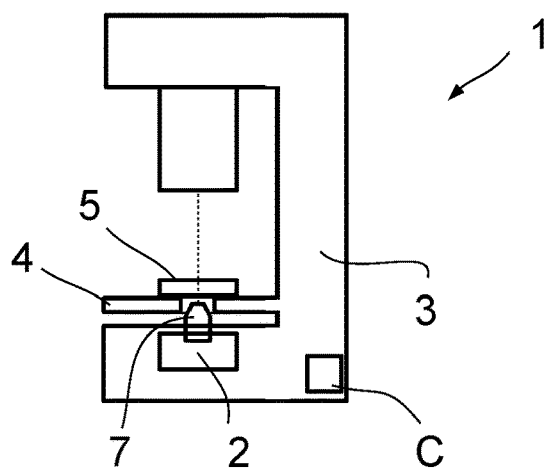
FIG. 1 shows a schematic illustration of an inverted microscope.

FIG. 1 schematically shows an inverted microscope 1, which comprises a nosepiece in a base of a limb 3. A sample stage 4, on which a sample 5 is disposed, is also situated on the limb 3. An illumination device illuminates the sample 5 from above, an objective 7 held in the nosepiece 2 images the illuminated sample 5 from its surface 6 facing the objective (cf. FIG. 2).

Figure 2:
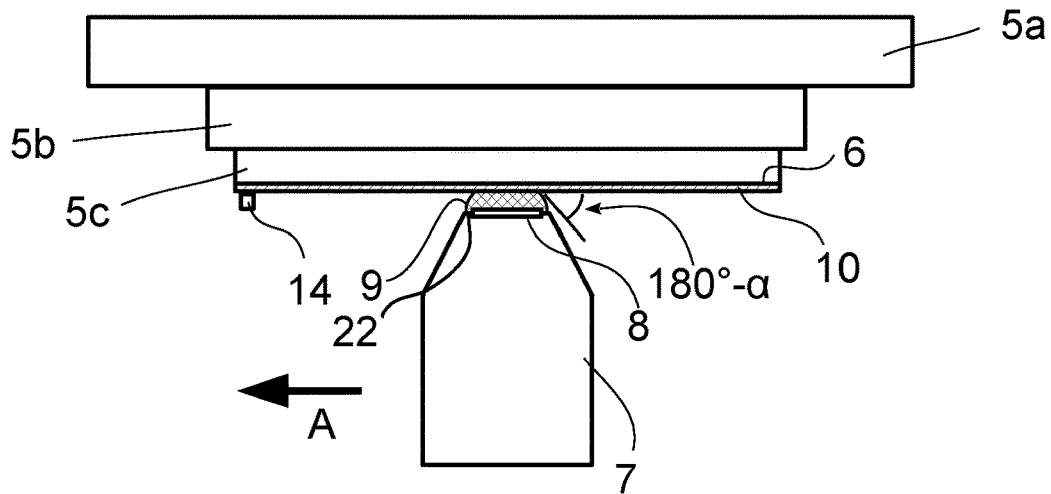
FIG. 2 shows an enlarged detail of the illustration in FIG. 1.
Figure 3:
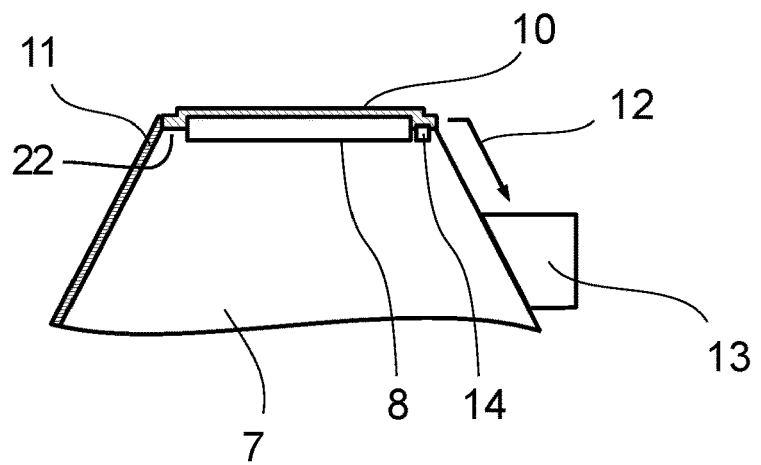
FIG. 3 shows the top side of the objective of the microscope in FIG. 1.

FIG. 2 shows an enlarged view of the relationships between the objective 7 and the sample 5, the latter consisting of a sample carrier 5a with, lying thereon, sample substance 5b and cover slip 5c.

The objective 7 comprises a mount 22 and front lens 8, on which an immersion liquid 9 is applied. The immersion liquid is selected appropriately depending on the application, i.e., the sample. The objective 7 is designed for a specific immersion liquid in some embodiments. The immersion liquid 9 is located in a gap between the cover slip 5c and the front lens 8 of the objective 7. Alternatively, the objective 7 can image the sample 5b via the sample carrier 5a. A coating 10 is applied in each case to the surface 6 of the cover slip 5c facing the objective 7 and to the front side of the objective 7, it being possible to switch said coating between two states by means of a switching device 14. In a first state, the coating 10 repels the immersion liquid 9. Then, the coating is lipophobic in the case of an oil-based immersion liquid and hydrophobic in the case of a water-based immersion liquid 9. Preferably, it is both lipophobic and hydrophobic, i.e., omniphobic. The switching device 14 is actuated by the control device C and is designed accordingly, depending on the configuration of the coating 10. In the case of a coating 10 which is switched over by electrical means, the switching device 14 is a corresponding wiring and contacting of the coating 10. In the case of a coating 10 which is switched over by light, the switching device 14 is an appropriate light source that acts on the coating 10 in suitable fashion.

In the state shown in FIG. 2, the coating 10 on the objective 7 is switched to the non-repulsive state and the coating on the cover slip is switched to the repulsive state. This is provided for phases of the microscopy process in which the objective 7 and cover slip 5c are displaced relative to one another, which is visualized in FIG. 2 by an arrow A. The objective 7 is displaced in this exemplary embodiment. It is equally possible to move the sample carrier 5a or both. So that the immersion liquid 9 does not smear on the cover slip 5c during the displacement along the plotted arrow A and is thus lost from the gap between the front lens 8 and the cover slip 5c, the coating 10 disposed on the surface 6 facing the objective 7 is switched to be repulsive for the immersion medium 9. Then, the effect of the coating 10 is that the immersion liquid 9 is repelled at the surface 6 on which the coating 10 has been applied. FIG. 2 elucidates this by a contact angle $\alpha$ of more than 90° (the counter angle 180°-$\alpha$ is plotted in the figure).

The front side of the objective 7, i.e., in particular, the front lens 8, is also provided with the coating 10 and the switching device 14 (this could be the same or a dedicated switching device). In the state of FIG. 2, the coating 10 on the objective 7 is switched into the state that does not repel the immersion liquid 9. In the case of the relative displacement along the arrow A, the immersion liquid 9 thus adheres reliably to the microscope objective 7 and is not smeared over the cover slip 5c at the same time.

In the illustrated embodiment, a further or additional layer 11, e.g., a border layer 11 extends downward along the objective casing. This is optional. It leaves a drainage channel 12 free, on which the casing and the edge of the front side of the microscope objective 7 are not coated. On account of this lack of coating, an applied immersion liquid 9 runs downward through the drainage channel 12 as soon as the coating 10 is switched to be repulsive. The drainage channel 12 ends in a receptacle 13 that receives the unwanted liquid.

Figure 4:
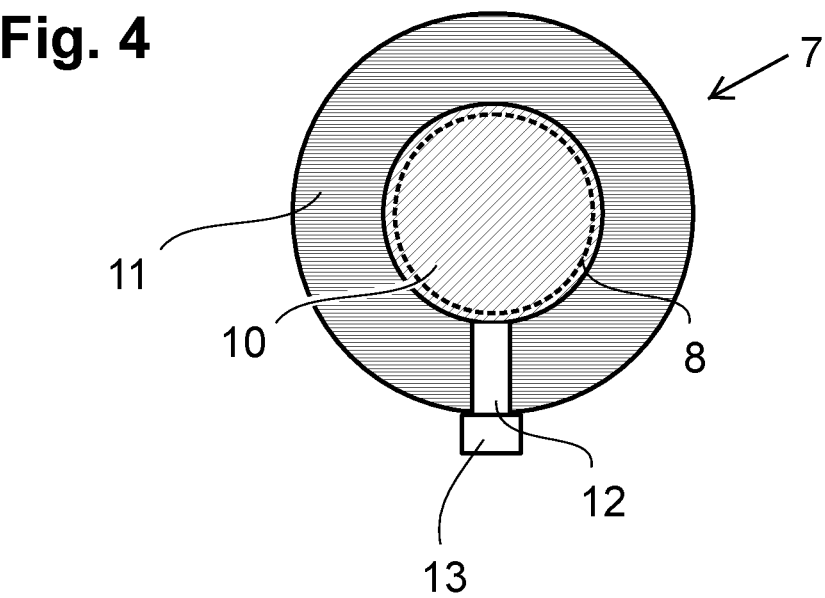
FIG. 4 shows a plan view of the objective.

FIG. 4 shows a plan view of the front side of the objective 7. The coating 10 covers the front lens 8, which is only drawn in dashed lines. The edge, however, is provided with the layer 11. What this achieves is that an immersion liquid that is repelled by the coating 10 cannot cover the surface with the border layer 11. By contrast, the drainage channel 12 is not coated at all, and so repelled immersion liquid can flow through the drainage channel 12 to the receptacle 13.

Figure 5A:
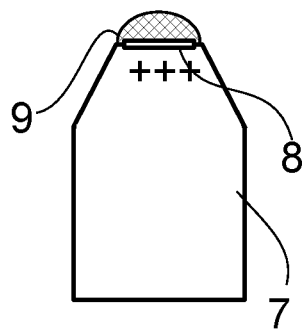
FIG. 5A to 5D show different states of the microscope objective and of a cover slip during a microscopy process.

FIGS. 5A to 5D show various stages that can be used, in particular, in a microscopy process in which a region to be imaged (a so-called region of interest) should initially be found by way of scanning immersion microscopy and then be examined in detail by microscopy. FIG. 5A shows the microscope objective 7 at the start of the microscopy process. The coating 10 is switched into the non-repulsive state, which is symbolized by "+". The contact angle of the immersion liquid 9 on the front side of the microscope objective 7 is less than 90°.

Figure 5B:
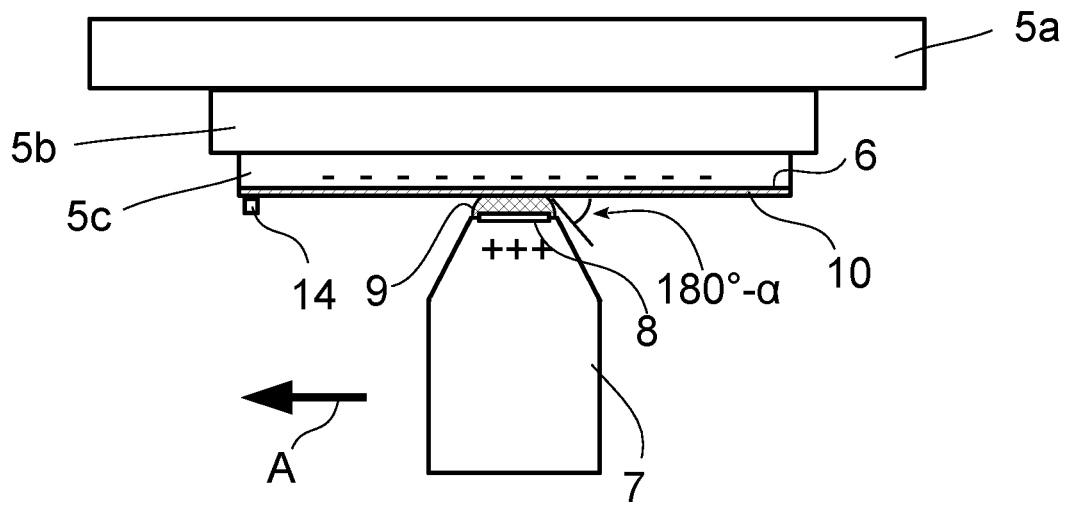
Figure 5C:
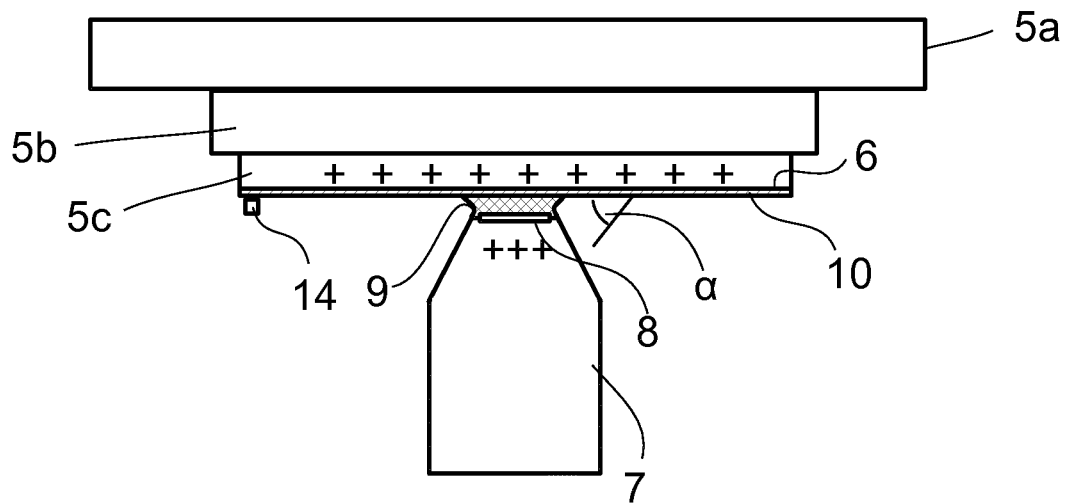

FIG. 5B shows the state in which the region to be imaged is sought. Objective 7 and sample 5 are displaced relative to one another. The objective 7 is switched into the attractive state of its coating 10 and the cover slip 5c is switched into the repulsive state. This is visualized by " " symbols. A contact angle of significantly greater than 90° arises on account of the repulsive property of the coating 10 on the surface 6 of the cover slip 5c. The supplementary angle (180°-$\alpha$) is plotted in the figure.

Once the region of interest has been found, the coating 10 on the cover slip 5c is switched to the attractive state. This can be seen in FIG. 5C. A contact angle $\alpha$ of significantly less than 90° then arises on the cover slip 5c, and so optimal wetting of the cover slip 5c is ensured when the region to be imaged is examined in detail by microscopy.

Once the imaging has been completed, the cover slip 5c is switched back into the repulsive state and the objective 7 is lifted off the cover slip. The immersion liquid 9 completely detaches from the cover slip 5c on account of the now repulsive property of the coating 10. No contamination remains.

Figure 5D:
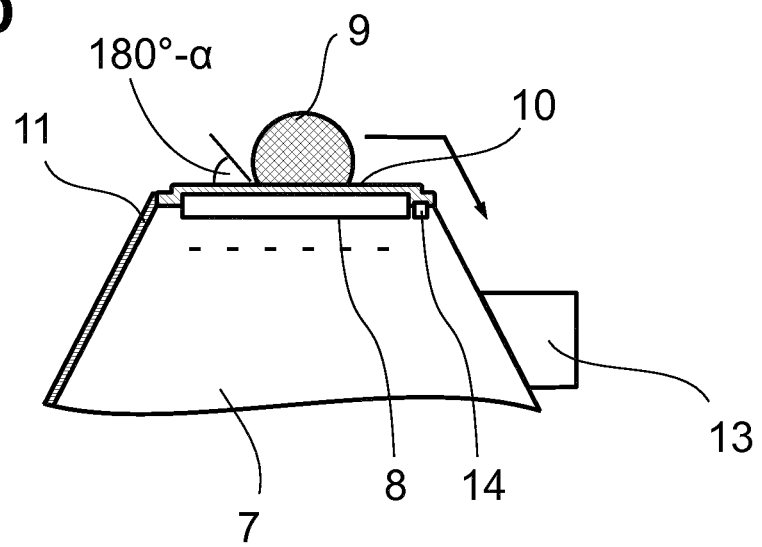

Finally, as can be seen in FIG. 5D, the coating on the objective 7 is switched into the repulsive state, resulting in a contact angle $\alpha$ of significantly greater than 90°. On account of the additional layer 11, the immersion liquid 9 can then only flow through the drainage channel to the receptacle 13 along the arrow A shown in FIG. 5D. Where necessary, this process is assisted by pivoting or rotating the objective 7 by the nosepiece 2.

In the exemplary embodiments described, the switchable coating 10 is provided both on the objective 7 and on the sample carrier 5a or the cover slip 5c (depending on which element lies in front of the objective 7). However, the invention is not restricted to the combination; the switchable coating can also be used only on either the objective 7 or the sample carrier 5a or cover slip 5c.

The invention claimed is:

1. A microscope objective for imaging a sample using a microscope, the microscope objective comprising a front lens enclosed by a mount and being configured for microscopy with an immersion liquid, wherein the front lens and/or the mount thereof comprise a coating which is switchable by an electrical or optical signal between a state that repels the immersion liquid and a state that does not repel the immersion liquid.

2. The microscope objective as claimed in claim 1, wherein the switchable coating of the front lens and/or the mount thereof is at least partially surrounded by a border layer that permanently repels the immersion liquid, wherein an area of the objective which extends away from the front lens is not covered by the border layer, is not repulsive and acts as a drainage channel for draining repelled immersion liquid.

3. The microscope objective as claimed in claim 2, wherein the border layer is lipophobic and hydrophobic.

4. The microscope objective as claimed in claim 2, wherein the drainage channel terminates at a receptacle for drained immersion liquid.

5. A microscope comprising a microscope objective as claimed in claim 1, and comprising a control device that is configured to clean the immersion liquid off the microscope objective following the completion of a microscopy process by virtue of switching the microscope objective into the state that repels the immersion liquid.

6. A combination of the microscope as claimed in claim 5, and a sample carrier or cover slip, switchable between a state the repels the immersion liquid and a state that does not repel the immersion liquid, and
    wherein the control device is configured to locate a region to be imaged on the sample, to switch the sample carrier or the cover slip into the state that repels the immersion liquid, at the same time switch the microscope objective into the state that does not repel the immersion liquid and displace the microscope objective and the sample relative to one another, and, after setting the region to be imaged on the sample, to switch the sample carrier or the cover slip into the state that does not repel the immersion liquid and to image by microscopy the region of the sample to be imaged.

7. The combination of the microscope and the sample carrier or cover slip, as claimed in claim 6, wherein the state of the sample carrier or cover slip that does not repel the immersion liquid is a state that attracts the immersion liquid.

8. A combination of a switching device and a sample carrier or cover slip for examining a sample, to be disposed on the sample carrier or under the cover slip, by microscopy, wherein the sample carrier or the cover slip comprises a coating which is switchable by an electrical or optical signal between a state that repels an immersion liquid and a state that does not repel the immersion liquid,
    wherein the switching device comprises wiring in contact with the coating so as to provide the electrical signal, or the switching device comprises a light source to provide the optical signal.

9. The sample carrier or cover slip of claim 8, wherein the state that does not repel the immersion liquid is a state that attracts the immersion liquid.

10. A method for examining a sample by microscopy using a microscope in a microscopy process, wherein use is made of a microscope objective that comprises a front lens enclosed by a mount and that is used for microscopy with an immersion liquid, wherein the front lens and/or the mount comprise a coating which is switchable by an electrical or optical signal between a state that repels the immersion liquid and a state that does not repel the immersion liquid, the method comprising:
    applying the electrical or optical signal to switch the front lens or the mount respectively into the state that repels the immersion liquid between a state that repels the immersion liquid and a state that does not repel the immersion liquid, and
    cleaning the immersion liquid off of the microscope objective following the completion of the microscopy process.

11. The method as claimed in claim 10, further comprising:
    switching a state of a sample carrier or cover slip, for the purposes of locating a region to be imaged on the sample, into a state that repels the immersion liquid, at the same time the microscope objective is switched into the state that does not repel the immersion liquid,
    displacing the microscope objective and the sample relative to one another,
    switching the sample carrier or cover slip into the state that does not repel the immersion liquid, after the region to be imaged on the sample has been set, and
    imaging the region of the sample to be imaged by microscopy.

12. The method as claimed in claim 11, wherein the state of the sample carrier or cover slip that does not repel the immersion liquid is a state that attracts the immersion liquid.

* * * * *